United States Patent Office 3,346,292
Patented Oct. 10, 1967

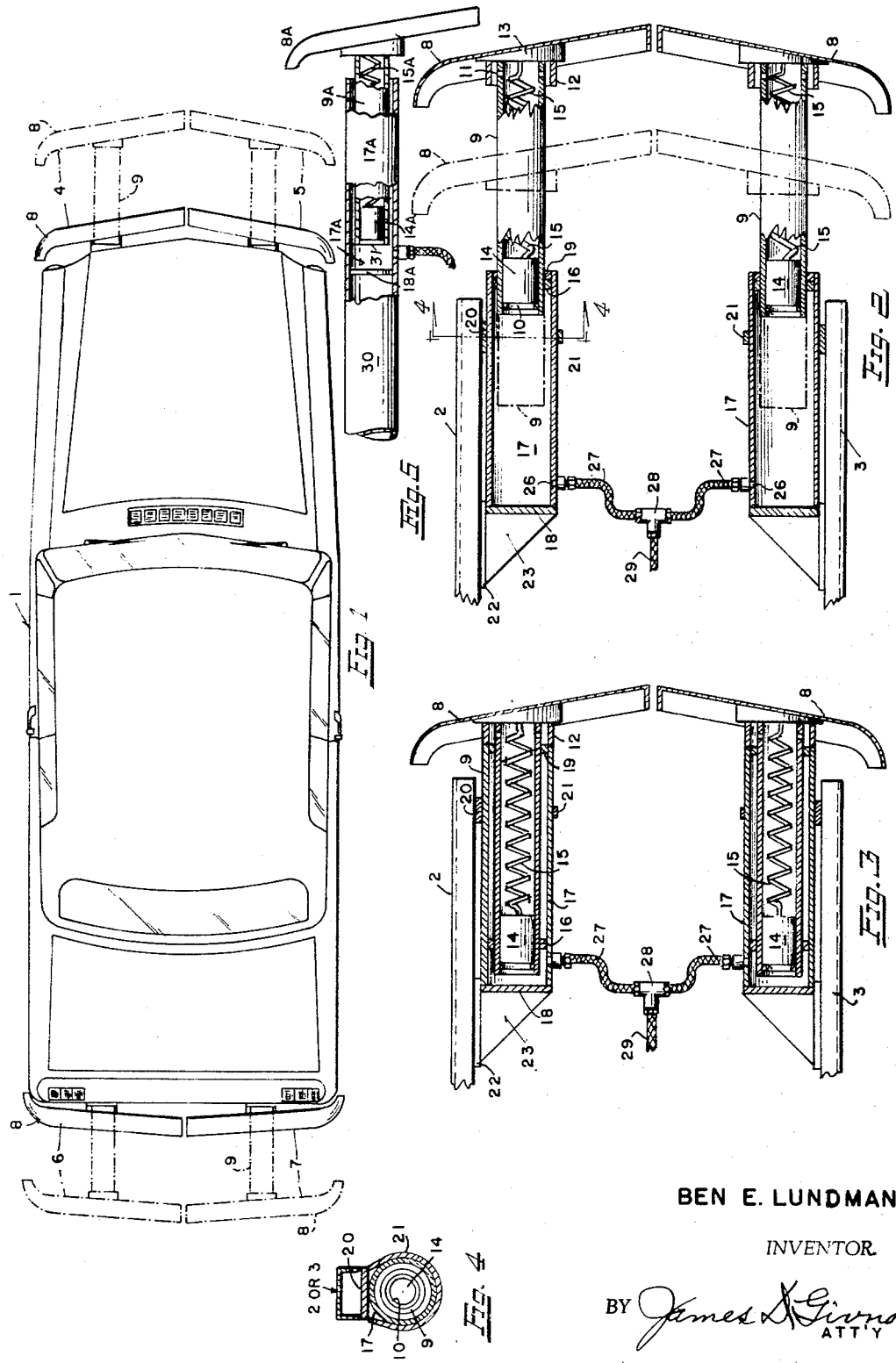

3,346,292
MOTOR-ACTIVATED CUSHIONING BUMPER
Ben Ervin Lundman, Rte. 1, Box 436,
Port Angeles, Wash. 98362
Filed Aug. 4, 1966, Ser. No. 570,281
2 Claims. (Cl. 293—9)

ABSTRACT OF THE DISCLOSURE

A bumper structure for the front and the rear ends of an automotive vehicle. Each structure comprises two identical units each provided with matching bumper bars which, when in a normal position, have the appearance of a conventional unitary bumper and are so mounted that collision impact forces against either bumper bar will be absorbed by its respective unit and those of a head-on collision by both units.

---

This invention relates to improvements in safety devices for automotive vehicles and more particularly to front and rear bumpers for such vehicles.

One of the principal objects of the invention is to provide a bumper of the character described which resembles a conventional bumper normally positioned transversely of a vehicle closely adjacent the front and rear ends thereof in the usual manner, and one which can be instantly extended from that position to effectively and automatically absorb collision impacts.

Another object of the invention resides in the provision of a bumper of this character made in two identical sections separately and independently operable from their normal position and in means mounting the related parts of those sections to a vehicle chassis in such a manner that each section will, upon impact, partake of the inertia of the frame of the vehicle.

Another object is the provision of a bumper of this character which is of simple, efficient, durable, inexpensive construction, positive and fool-proof in operation and which normally has the general appearance of a conventional bumper.

The foregoing and other objects and advantages which will become subsequently apparent reside in the details of construction and operation as more fully hereinafter described and claimed, reference being had to the accompanying drawing forming a part hereof and in which:

FIGURE 1 is a top plan view of a vehicle provided with front and rear bumpers made in accordance with my invention and shown respectively in operative and normal positions by broken and full lines.

FIGURE 2 is a top plan view on an enlarged scale typical of either the front or rear bumper in an extended position and with fragments broken away and parts in section for convenience of illustration.

FIGURE 3 is a view similar to FIGURE 2 showing the bumper in a conventional position.

FIGURE 4 is a sectional detail view taken along line 4—4 of FIGURE 2, and

FIGURE 5 is a fragmentary detail view of a modified form of the invention.

With continuing reference to the drawing wherein like references of character designate like parts, reference numeral 1 indicates generally any type of automotive vehicle having a chassis (FIGS. 2–3) including frame members 2 and 3 which may be of channel section or the like throughout their length and extend substantially full length of the vehicle.

Since the front and rear bumper units, respectively indicated generally at 4–5 and 6–7, are identical as are the means for mounting them to the chassis frame members a description of one will suffice for all.

With particular reference to FIGURE 1, the front and rear bumper units as shown in full lines are in their normal position closely adjacent their respective ends of the vehicle, and in broken lines in an operative impact-absorbing position in accordance with the invention.

Each bumper unit is provided with a bumper section 8 and both sections normally present the appearance of a conventional bumper. Each section is secured by welding or the like to the forward end of a hollow cylinder 9 provided with an internal annular limit stop 10 at its inner end and air vents 11 at its forward end surrounded by a collar 12 secured as at 13 to its respective bumper section in the same manner as the cylinder 9. Slidably mounted within the cylinder 9 is a piston 14 opposed by a compression spring 15 whose one end is secured to the piston 14 in any suitable manner and whose opposite end is similarly secured to its respective section of the bumper unit 4.

The cylinder 9 is provided with an external packing ring 16 and slidably mounted within an air cylinder 17 closed at one of its ends as at 18 and provided at its opposite end with an annular limit stop 19 for outward movement of cylinder 9 as will be more fully hereinafter pointed out.

As best illustrated in FIGURE 4, each air cylinder 17 is permanently secured to its respective channel frame member by a plate 20 welded across the channel flanges and by a band 21 embracing the cylinder and secured by welding or the like to the top and bottom edges of the plate 20 or if desired bolted or otherwise secured to the top and bottom surfaces of the flanges of the frame member. The rearward end of air cylinder 17 is secured to its respective channel frame member by a second plate 22 similarly secured across the flanges of the frame channel and to the closed rearward end of the cylinder. This end of the cylinder is further supported and reinforced against rearward thrust loads by a gusset 23 secured to plate 22 and cylinder closure plate 18.

The interior of air cylinder 17 is in open communication as at 26 with an air supply line 27 in communication through a T-fitting 28 and common feed line 29 with a source of air pressure, not shown. The four bumper units 4–5 and 6–7 and their related parts are identical as above pointed out, as are their operation which is as follows:

As a precautionary measure or in anticipation of a front or rear end collision, the bumper units 4–5 can be advanced instantly from their normal retracted full line position, FIGURE 1, to the extended broken line position shown in FIGURE 2 by directing air pressure through the lines 27 and 29 from a suitable control valve, not shown, to the interior of the air cylinders 17. This pressure acting against the pistons 14 and transmitted to the cylinders 9 through the springs 15 will project both bumper units outwardly into their operative shock-absorbing position.

Conversely, the thrust load of sudden bumper impact imparted to the bumper units in an opposite direction will, in reverse order, force the bumper sections 8 and their respective cylinders 9 inwardly against the cushioning effect of the springs 15 and that of the air cushion backing the pistons 14.

Exhausting air pressure from the air cylinders 17 by valve manipulation will allow complete retraction of the bumper units to their normal position. Any pressure build-up within the cylinders 9 in advance of the pistons 14 during compression of the springs 15 is prevented by the air vents 11 in the cylinder 9.

As shown in the modification in FIGURE 5, the chassis frame member 30 may be of tubular form either throughout its length or for a suitable portion thereof to replace the chassis channel sections 2 and 3 in the first form of the invention. The end portion of the tubular member 30 is closed or sealed as at 18A in any suitable manner to serve as the air cylinder 17A provided with an air supply line 27A also as in the first form. The bumper section 8A is secured to the forward end of the hollow cylinder 9A provided on its interior with compression spring 15A, piston 14A and also open at its inner end as at 31 to partake of the air pressure within the air cylinder 17, also as in the first form of the invention.

It will be readily apparent that the operation of the modified form of the invention will be the same as that described for the first form since the only difference between the two is that the air cylinder 17 of FIGURE 2 is replaced by the end section of the tubular member 30 sealed by the closure 18A.

It will be readily understood that the air cylinders 17–17A, along with their related cylinders 9–9A and the pistons 14–14A may, if desired, be of square section to prevent any tendency of the latter to rotate about their longitudinal axis due to the overbalance of the lateral portions of the bumper sections 8–8A which extend inwardly to a slightly greater extent than they do outwardly.

While I have shown particular forms of embodiment of my invention, I am aware that many minor changes therein will readily suggest themselves to others skilled in the art without departing from the spirit and scope of the invention. Having thus described my invention, what I claim as new and desire to protect by Letters Patent is:

1. In a vehicle having a chassis including two longitudinal frame members, the improvement comprising:
   (a) shock absorber units associated one each with said frame members,
   (b) horizontally aligned identical bumper bars carried one each by said units,
   (c) means mounting said units one each to said frame members,
   (d) each of said units comprising an elongated air cylinder open at its forward end and closed at its rearward end,
   (e) an annular limit stop secured within said air cylinder at said forward open end thereof,
   (f) a fluid pressure conduit in open communication with the interior of said air cylinder at the rearward end thereof,
   (g) a hollow piston substantially equal in length with that of said air cylinder slidably mounted therewithin and extending through said annular limit stop,
   (h) an annular limit stop secured within said hollow piston at the rearward end thereof,
   (i) two horizontally aligned identical bumper bars,
   (j) means permanently securing each of said bumper bars to said forward ends of its respective hollow piston,
   (k) a floating piston slidably mounted within said hollow piston,
   (l) a compression spring within said hollow piston and disposed between said bumper bar securing means and said floating piston whereby impact forces of head-on collision will be absorbed by both of said units, and like forces to either of the units will be absorbed thereby individually.

2. The improvement as claimed in claim 1 wherein said frame members are of channel section, and
   (a) each of said air cylinders is permanently secured at both of its ends to the flanges of its respective channel frame members.

References Cited

UNITED STATES PATENTS

| | | | |
|---|---|---|---|
| 1,355,182 | 10/1920 | Stott et al. | 293—9 |
| 1,530,017 | 3/1925 | Souliotis | 293—71 |
| 1,570,624 | 1/1926 | Dominguez | 293—71 |
| 1,799,065 | 3/1931 | Rohm | 293—86 |
| 2,404,931 | 7/1946 | Somervell | 293—86 |
| 2,628,118 | 2/1953 | Gunnels | 293—86 X |
| 2,977,146 | 3/1961 | Edwards et al. | 293—86 X |

ARTHUR L. LA POINT, *Primary Examiner.*

H. BELTRAN, *Assistant Examiner.*